No. 752,118. PATENTED FEB. 16, 1904.
F. M. STEARNS.
HAND FISH DRESSING IMPLEMENT.
APPLICATION FILED MAR. 20, 1903.
NO MODEL.

Witnesses:
Jas. E. Hutchinson
C. P. Jarges

Inventor.
F. M. Stearns
by William F. Hall
Atty.

No. 752,118. Patented February 16, 1904.

UNITED STATES PATENT OFFICE.

FRED M. STEARNS, OF STARLAKE, WISCONSIN.

HAND FISH-DRESSING IMPLEMENT.

SPECIFICATION forming part of Letters Patent No. 752,118, dated February 16, 1904.

Application filed March 20, 1903. Serial No. 148,709. (No model.)

*To all whom it may concern:*

Be it known that I, FRED M. STEARNS, a citizen of the United States, residing at Starlake, in the county of Vilas and State of Wisconsin, have invented certain new and useful Improvements in Hand Fish-Dressing Implements, of which the following is a specification.

My invention relates to hand implements for dressing fish; and the object thereof is to provide a compact, simple, durable, and highly-efficient article of this character having a knife for cutting or slitting the fish and for removing the head, tail, and fins, a blade for cleaning the fish, a scraper for removing the scales therefrom, and gripping means for engaging the skin to remove the same in dressing such fish as are prepared in this manner.

The invention includes the combination and arrangement of component parts and details of construction, as will be hereinafter described, and particularly pointed out in the claims.

While the invention is susceptible of some modifications, the accompanying drawings illustrate and I shall hereinafter describe in connection therewith what is now conceived to be the preferred embodiment of the same.

Figure 1:
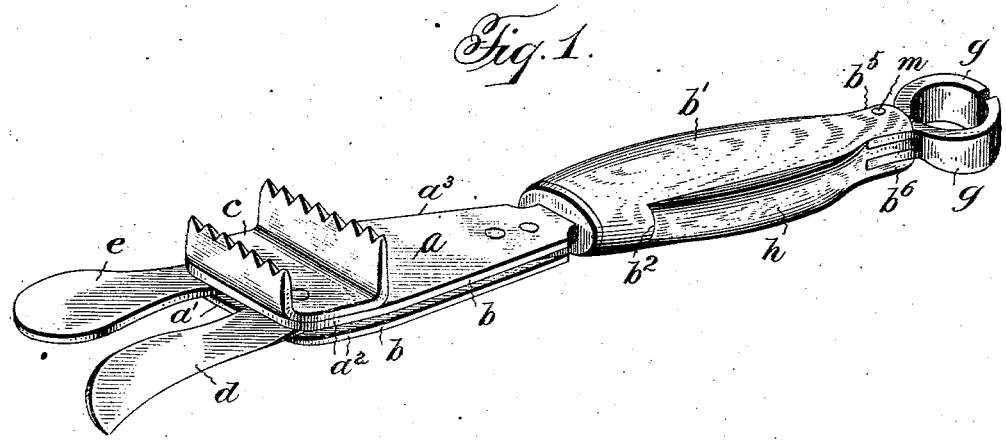
Figure 2:
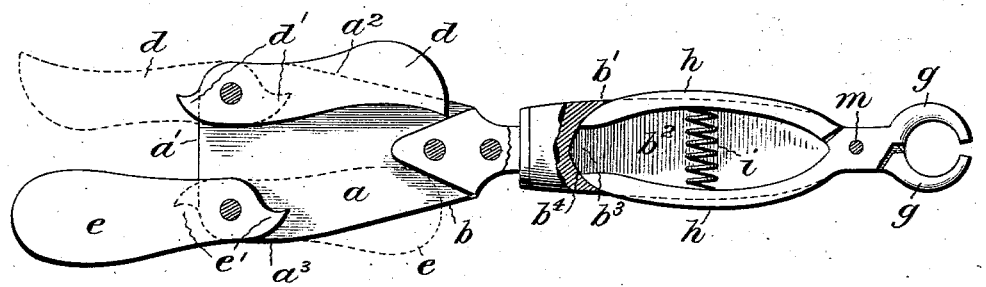

In the drawings, Figure 1 is a perspective view of the implement in inverted position, showing both of the operating-blades forming a part thereof in their open positions; and Fig. 2 is a plan view of the implement with parts broken away, showing but one of the blades in open position.

The invention includes generally a dressing implement comprising a flat body portion, a handle carrying the same, a scaler rigidly secured to one face of the body, a cutting or slitting blade pivoted to the body and designed when out of use to be housed therein, a cleaning-blade also pivoted to the body and adapted to be housed in the same when out of use, and gripping means associated with the handle and preferably constituting a part thereof.

The body $a$ is preferably constructed of two counterpart flat plates $b\ b$, substantially triangular in shape, spaced a distance apart to provide a receiving recess or pocket between the same and held in proximity to their apices in a suitable handle $b'$.

To one face of the body $a$, parallel to the outer edge $a'$ thereof, a short channel or U-shaped strip $c$ is secured, the longitudinal edges of which are serrated, toothed, or otherwise shaped to adapt them for efficiently removing the scales of the fish.

Between the plates $b\ b$, at the angle of the body $a$ formed by one inclined side $a^2$ and the edge $a'$, a blade $d$ is pivotally mounted, having a cutting edge and a tailpiece or heel $d'$ extending beyond the pivot thereof and projecting beyond said edge $a'$ when the blade is out of operating position and housed between the two plates $b\ b$. This heel is designed to be engaged with a suitable abutment in order to force the blade outwardly into operating position without the necessity of gripping the same with the fingers, but merely by pressing upon the handle $b$. Similarly mounted between the plates $b\ b$, at the angle of the body $a$ formed by the side $a^3$ and the edge $a'$, is a scraper or cleaning blade $e$, having a rounded working end with blunt edges and a tailpiece or heel $e'$, corresponding to the heel $d'$ and performing a like function in connection with said blade $e$.

As will be appreciated, the blades are preferably separately thrown into and out of operative positions, and when so thrown they extend beyond the edge $a'$ of the body $a$ substantially at right angles thereto and in alinement with said body and handle, and when in such position either of the blades is manipulated with the greatest facility.

As will be noted in the drawings, the pivot-pins for the blades $d\ e$ extend through both of the plates $a\ b$ and through the strip $c$ and serve to retain the latter rigidly in position.

As hereinbefore premised, I preferably provide means associated with the handle for facilitating the removal of the skin from such fish as are dressed in this manner. For this purpose a pair of coacting gripping-jaws are associated with the handle, said jaws preferably constituting portions of a pair of pincers, which are associated with and constitute a part of the handle $b'$. The jaws $g\ g$ of the pincers project beyond the butt of the handle $b$ in axial alinement with the same, and the legs $h\ h$ thereof are housed within said handle and so arranged that they will be pressed together to close the jaws by the same action employed in gripping the handle. To accommodate the legs $h\ h$, the butt-end of the handle is bifurcated or provided with a longitudinally-extending recess $b^2$, which preferably terminates at one end of the same in a pocket $b^3$, the wall $b^4$ of which provides oppositely-arranged stops for limiting the separation of the legs $h\ h$, which are normally forced apart by a spring $i$ or like device interposed between the same. The legs $h\ h$ extend longitudinally of the handle and are substantially of the width of the recess $b^2$, formed for their reception, and their outer sides are preferably arranged to be normally flush with or extend slightly beyond the surface of the handle to preserve the continuity of the gripping-surface of the latter and general appearance of the same. In order to provide for pressing the legs together to close the jaws $g\ g$, the intermediate portions thereof are provided with surfaces which project beyond the gripping-surface of the handle when said legs are in normal positions, in which positions the jaws $g\ g$ are slightly separated, and consequently in order to close said jaws it is only necessary to grip the handle firmly, which will force said projecting portions of the legs toward each other and within the recess $b^2$ in the handle. The pincers are constructed, as usual, of two members pivoted together, and in the present exemplification of my invention the pivot $m$, employed for connecting said members, also extends through the two limbs $b^5\ b^6$, formed by the bifurcation or recess $b^2$, and serves to hold the pincers in place and the handle rigid. The arrangement thus presents a complete structure, which neither detracts from the appearance of the handle or interferes with the usual manipulation of the same, but which provides for the ready and convenient manipulation of the gripping-jaws.

The construction and operation of my invention will be readily understood upon reference to the foregoing description and accompanying drawings, and it will be appreciated that the parts and combinations recited may be varied within a wide range without departing from the spirit and scope thereof.

Having thus described my invention, what is claimed as new, and desired to be secured by Letters Patent, is—

1. In a fish-dressing implement, and in combination, a handle, a triangular flat body, a channeled strip, having serrated edges, secured to one face thereof and projecting therefrom, a cutting-blade pivoted adjacent to one angle of the same, and a cleaning-blade pivoted adjacent to the other angle thereof, substantially as described.

2. In a fish-dressing implement, and in combination, a body portion comprising two flat counterpart triangular plates, a handle rigidly secured thereto arranged at the apex thereof, a cutting-blade pivoted between the plates adjacent to one of the angles of the same mounted to be swung into housed positions between said plates, a cleaning-blade similarly mounted adjacent to the other angle of the body and a channel-shaped strip having serrated longitudinal edges, said strip extending transversely of the plates and being secured to the face of one of the same adjacent to the base of the triangle, substantially as described.

3. In a fish-dressing implement and in combination, a body portion, comprising two counterpart plates, a handle rigidly secured thereto, cutting and cleaning blades mounted between the plates to be housed therebetween and to be thrown into extended positions, a scraper arranged upon the face of one of the plates and projecting therefrom, and pivot-pins for said blades extending through the plates and through the scraper for securing the latter rigidly in place, substantially as described.

4. In a fish-dressing implement, the combination with the body portion, slitting and cleaning knives associated therewith, a scaler also associated with said body portion, a handle and a gripping device partly housed within the latter having jaws projecting from the butt-end thereof in axial alinement therewith, substantially as described.

5. In a fish-dressing implement and in combination, a handle, a flat body portion projecting from one end thereof, cutting and scraping blades pivoted in the body, a scraper-strip rigidly secured to one side of the latter, and a gripping device comprising legs housed in said handle, and gripping-jaws projecting from the butt-end thereof in axial alinement therewith, substantially as described.

6. In a fish-dressing implement and in combination, a recessed handle having a socket at one end of said recess and a pair of pincers having their jaws projecting beyond the end of the handle and their legs housed in said recess with the extremities thereof extending into said socket and coacting with the wall of the same, and means interposed between the legs for forcing them apart, substantially as described.

7. In a fish-dressing implement, and in combination, a bifurcated handle, stops arranged at one end of said bifurcation, a pair of pincers having the jaws thereof projecting beyond the butt-end of the handle and the legs thereof arranged in said bifurcation with the extremities of the same coacting with said stops and a pin for pivotally connecting the two members of the pincers and for securing the latter to the handle, substantially as described.

8. In a fish-dressing implement and in combination, a flat body portion, slitting and cleaning blades pivotally mounted therein, a scraper rigidly secured thereto, a bifurcated handle carrying the body portion, a gripping device comprising two members each including a leg and a jaw portion, and a pin passing through the handle and said members for pivotally connecting the latter to each other and for retaining the gripping device within the bifurcation in said handle with the jaw portions projecting beyond the butt-end thereof, substantially as described.

9. In a fish-dressing implement and in combination, a flat body portion, slitting and cleaning blades pivotally mounted therein, a scraper rigidly secured thereto, a bifurcated handle carrying the body portion having a socket in one end thereof, and a gripping device comprising two members each including a leg and a jaw portion, and a pin passing through the handle and said members for pivotally connecting the latter to each other and for retaining the gripping device within the bifurcation in said handle with the jaw portions projecting beyond the butt-end thereof, and the ends of the leg portion projecting into said socket, substantially as described.

In testimony whereof I hereunto sign my name, in the presence of two attesting witnesses, at Starlake, in the county of Vilas and State of Wisconsin, this 17th day of March, 1903.

FRED M. STEARNS.

Witnesses:
CHAS. LAU, Jr.,
B. J. VAUGHAN.